United States Patent
Tatraux-Paro et al.

[11] Patent Number: 5,899,538
[45] Date of Patent: May 4, 1999

[54] WHEEL FOR MOTOR VEHICLES AND METHOD OF MANUFACTURING SUCH A WHEEL

[75] Inventors: Jean-Michel Tatraux-Paro, Clermont-Ferrand; Alain Vaxelaire, Romagnat, both of France

[73] Assignee: Compagnie Generale des Etablissements Michelin—Michelin & Cie, Clermont-Ferrand Cedex, France

[21] Appl. No.: 08/828,840

[22] Filed: Mar. 24, 1997

[30]     Foreign Application Priority Data

Apr. 2, 1996 [FR] France ................................ 96 04298

[51] Int. Cl.$^6$ ....................................................... B60B 7/04
[52] U.S. Cl. ................................................ 301/65; 301/95
[58] Field of Search ............................... 301/64.7, 65, 95, 301/96, 97, 98

[56]           References Cited

U.S. PATENT DOCUMENTS

| | | | |
|---|---|---|---|
| 2,439,881 | 4/1948 | Ash ............................................. | 301/65 |
| 3,250,571 | 5/1966 | Richter ....................................... | 301/65 |
| 4,100,247 | 7/1978 | Shead et al. ............................. | 264/271 |
| 4,436,133 | 3/1984 | Rohr ........................................ | 301/65 X |
| 4,721,342 | 1/1988 | Daniels et al. .......................... | 301/64.7 |

FOREIGN PATENT DOCUMENTS

| | | |
|---|---|---|
| 524458 | 9/1982 | Australia . |
| 9301946 | 2/1993 | European Pat. Off. . |
| 3902365 | 8/1990 | Germany ................................. 301/65 |
| 59-9164202 | 9/1984 | Japan ....................................... 301/65 |
| 59-195401 | 11/1984 | Japan . |
| 62-2173301 | 7/1987 | Japan ..................................... 301/64.7 |
| 0247201 | 10/1989 | Japan ....................................... 301/65 |
| 03193501 | 8/1991 | Japan . |

Primary Examiner—Russell D. Stormer
Attorney, Agent, or Firm—Baker & Botts, L.L.P.

[57]           ABSTRACT

A wheel for motor vehicles in which a rim (2) of composite material and a metal disk (3) are assembled to each other by an assembly edge (6) formed by the free peripheral end of the disk (3) and the assembly edge (6) is embedded in the rim (2) in such a manner that both faces of the edge are covered by the rim. A method of manufacturing such a wheel which includes the steps of producing the metal disk (3), then positioning the free peripheral end (6) of the disk (3) in a mold, and molding the rim (2) on the end, the rim covering the two faces of the end (6).

11 Claims, 2 Drawing Sheets

WHEEL FOR MOTOR VEHICLES AND METHOD OF MANUFACTURING SUCH A WHEEL

BACKGROUND OF THE INVENTION

The present invention relates to a wheel for motor vehicles and a method of manufacturing such a wheel.

Wheels for motor vehicles are generally formed of two pieces of steel, namely the disk and the rim, made by the pressing or forming of profiled members which are then assembled by welding. The use of steel makes it possible to obtain very good mechanical and thermal performance in the manufacture of heavy wheels. With the emphasis placed today on the saving of energy, one major concern of automobile manufacturers is to reduce the weight of the parts of the automobile, such as the wheels, in order to decrease the consumption of gasoline and improve the maneuverability of the vehicles.

One solution consists in making the wheels of light alloys; however, their cost price is three to five times greater than that of steel wheels. The use of plastics is another solution which makes it possible to effect a large reduction in weight, but it is difficult to obtain sufficient mechanical properties in the wheels obtained and furthermore problems arise with respect to the removal of the thermal energy transmitted by the brake disks.

For this reason, other solutions have been developed, such as so-called "hybrid" wheels which have a metal disk, which assures both the properties of resistance and thermal conduction, and a plastic rim, which permits a saving in weight.

Thus, WO 93/01946 describes a wheel which comprises an essentially metallic disk and a plastic rim, which are manufactured separately and then assembled by screwing. However, the assembling by screwing results in a high cost of industrialization and requires very great precision in order to obtain good coaxiality between the disk and the rim.

Furthermore, the presence of screw support elements at certain points of the wheel creates fragile zones which present further risks of rupture. Finally, the screwing on of a plastic material causes a flow of the material in the screwing region and hence a change, over the course of time, in the initial clamping produced and therefore a joint-disk connection which is not reliable. Moreover, this connection is greatly stressed under the effect of the inflation pressure of the tire and the external constraints experienced during travel.

JP-A-03193501 shows a different embodiment of a hybrid wheel formed by a metal disk of light alloy and by a rim comprising a first inner part of light alloy in contact with the disk and a second outer part of plastic bonded to the first part of the rim. This construction involves combining the metal disk and the first metal part of the rim by molding or forging, and then of finishing this first part by mechanical processes in order to produce therein a circumferential groove and holes which together form protrusions on the circumference of said first part of the rim, and finally of a molding of the second plastic part of the rim on the first part in such a manner that the second plastic part rests on the end of the outer surface of the first part and covers the protrusions. The connection between the two parts of the rim, effected by the resting of the second part on the first, is thus reinforced by a unity in rotation obtained by the presence of the covered protrusions.

This wheel, due to this additional rim inner part, is of a complicated structure. On the one hand, the presence of this additional inner part of light alloy increases the cost of manufacture of such a wheel, due to the sensitivity of the cost to the amount of expensive light alloy used and, on the other hand, due to the numerous manufacturing steps which it requires and which increase the time of manufacture of the wheel. Furthermore, the resting obtained between the two parts of the wheel constitutes a connecting zone of poor tightness.

SUMMARY OF THE INVENTION

The object of the invention is a hybrid wheel having an improved attachment between the rim and the disk.

In accordance with the invention, the wheel comprising a rim formed of a plastic material and a metal disk which are assembled by an assembly edge is characterized by the fact that the assembly edge is formed by a free peripheral end of the disk and that this assembly edge is inserted in the rim in such a manner that the two faces of said edge are covered by the rim.

The covering of the end of the disk thus effected makes it possible, in fact, to assure a simple and reliable connection of the disk and rim without requiring the presence of an intermediary part. Furthermore, the rim thus effects a hooping of the assembly edge of the disk, which assures very good tightness of the connection and unity in rotation of the disk and rim.

The assembly edge is advantageously provided with assembly reinforcement holes distributed uniformly over its circumference, within which the rim material is introduced to serve as locking connections between the rim and the disk.

Such an arrangement makes it possible to improve the connection between the rim and the disk, the latter being penetrated by the material constituting the rim.

The invention makes it possible to obtain a wheel having good coaxiality between the rim and the disk.

The invention also relates to a method of manufacturing a hybrid wheel which includes the steps of producing a metal disk, positioning the free peripheral end of the disk in a mold and molding the rim over said end, the rim covering both faces of said end.

Such a method of manufacture is at the same time advantageous due to the simplicity of its industrialization and the low cost of the latter.

Other characteristics and advantages of the invention will become evident from the description of an embodiment of a wheel according to the invention read with reference to the drawings.

DESCRIPTION OF PREFERRED EMBODIMENTS

Figure 1:
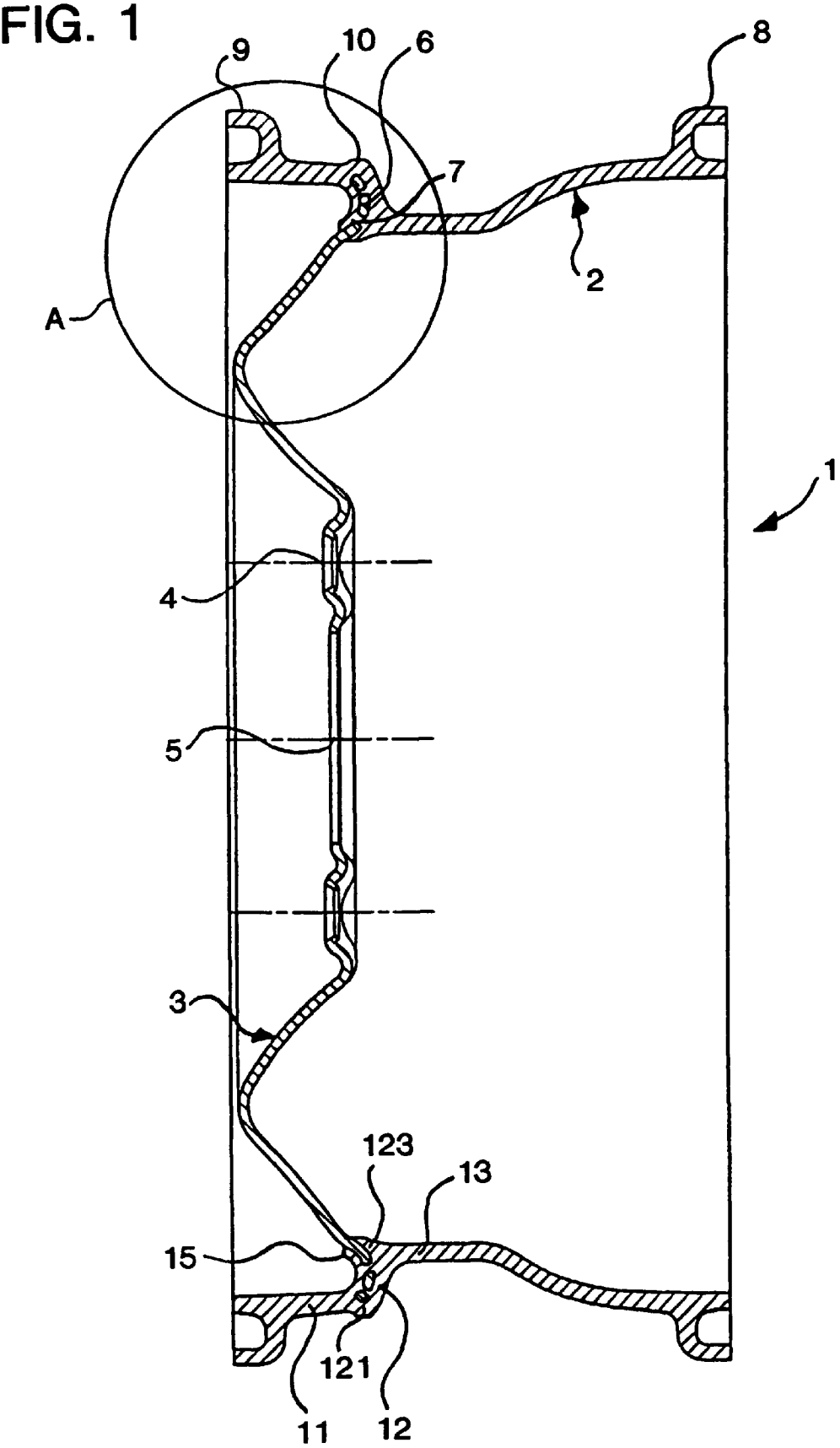
FIG. 1 is an axial section through the wheel of the invention.

In accordance with FIG. 1, the wheel 1 has a rim 2 of composite material and a metal disk 3 which are assembled to each other.

The disk 3 has holes 4 in its central portion for fastening the wheel on a hub (not shown) and an opening 5 for the centering of the wheel 1 with respect to said hub. The disk 3 also has an assembly edge formed by the free peripheral end 6 of said disk for assembly with the rim 2. This assembly edge 6 is pierced by assembly reinforcement holes 7 uniformly distributed over its circumference.

The rim 2, which is of hollow cylindrical shape, is provided at its peripheral ends with flanges 8 and 9 for retaining the beads of a tire (not shown).

The rim 2 also has, in conventional manner, a seat 11 to receive one of the beads, located between the flange 9 and a boss 10 for retaining said bead in position, the boss being referred to by the English word "hump", and a well 13 connected to the seat 11 by an annular rim section 12. The section 12 has two ends 121 and 123 which connect the seat 11 and the well 13, respectively, the end 121 defining the hump 10.

Figure 2:
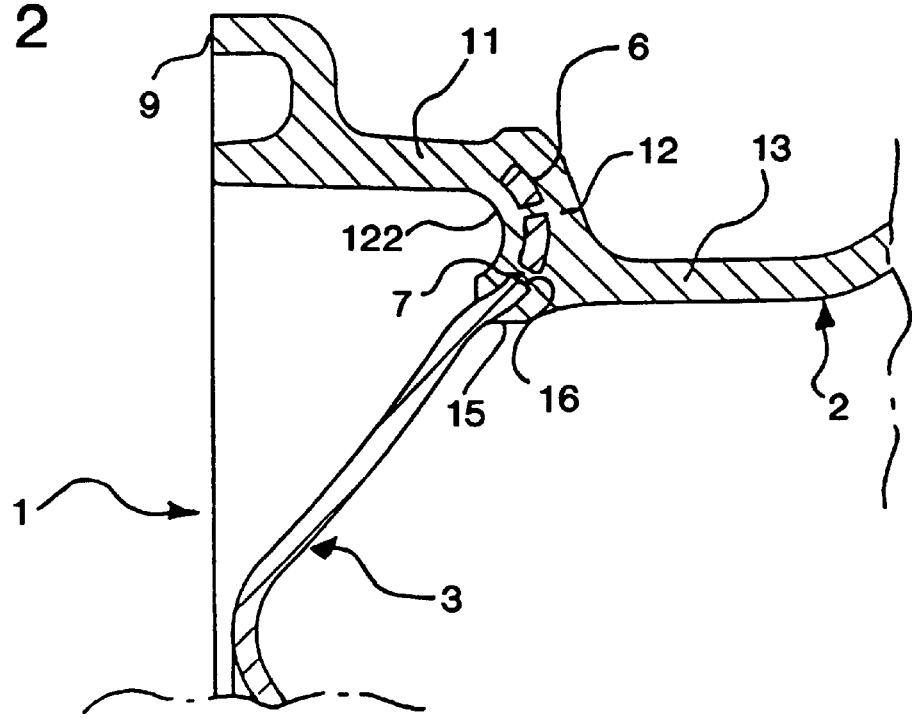
FIG. 2 is an enlargement of detail A of FIG. 1.

As shown in FIG. 2, the rim 2 is molded over the assembly edge 6 so that the latter is inserted in the section 12 and extends in a direction substantially parallel to the generatrices of said section, the disk 3 emerging from the radially inner wall 123 of the section 12 near the junction zone of said section 12 and the wall of the well 13. In order not to create weak points in the section 12, the assembly edge 6 extends radially inside said section 12 over the entire length of the latter.

The rim 2 thus covers the two faces of the assembly edge 6, which makes it possible to effect a hooping of said edge by the rim 2 and thus to assure both very good tightness of this connection and very good unity in rotation of the rim 2 and the disk 3.

The reinforcement holes 7 of the assembly edge 6 are thus filled by the composite material constituting the rim 2, which therefore form locking connections 16 between the rim and the disk. The presence of these locking connections 16 make it possible to reinforce and improve the connection between the rim 2 and the disk 3 by producing, in addition to the molding of the rim around the assembly edge 6, a flow of molded material which passes through said edge to form the locking connections.

Furthermore, the assembly edge 6 is curved towards the outside of the disk 3 with respect to the mounted wheel, that is to say towards the bead retaining flange 9, in the same way as the surface 122 of the section 12 within the rim 2. This curved arrangement makes it possible to assure a better distribution over the wheel of the constraining forces acting axially on it during travel. The obtaining of such a distribution is particularly important since at the present time, because of the space taken up generally due to the brake disks, the thickness of the rim is limited.

The forming of a connection of the rim 2 and the disk 3 over the entire circumference of the rim 2 also makes it possible to have a substantially uniform distribution of the weight over the rim. In order to extend this zone of connection, the end 123 of the section 12 has a protrusion 15 which is directed towards the inside of the rim 2, which follows the curvature of the section 12. The assembly edge 6 is also inserted in this protruding part 15 along the curvature of the latter.

Furthermore, the deformation due to the inflation pressure of the tires which causes working in particular of the section 12 is greater when the rim is made of a composite material, particularly in the case of thermoplastic materials, than of metal. In order to avoid too great a lowering between the well 13 and the flange 8, it is therefore necessary to have a greater rigidity of the flange 8. The phenomenon is also present at the level of the flange 9 although less amplified due to the shorter length of rim between said flange and the section 12.

Nevertheless, too great a rigidity of the flanges 8 and 9 would entail the danger of producing, upon the application of constraint formed by the inflation pressure of the tires on the rim 2, a deformation of the rim 2 corresponding to a lowering of the central portion of the rim 2 towards the center of the wheel 1, which is not desirable either.

In order, therefore, to produce a rim 2 which is a sufficiently rigid support for the tire, the flanges 8 and 9 have a U-shaped axial section. This particular shape, while increasing the mass at the level of the flanges and therefore the rigidity, makes it possible to preserve a certain flexibility of said flanges.

Thus, the effect of the inflation pressure of the tire can cause only a slight deformation on the rim 2, which will nevertheless retain the profile of said rim.

Thus, the wheel 1 has both the mechanical and the thermal characteristics necessary, without presenting a region of great fragility. This wheel provides a firm and reliable connection between the rim and the disk.

In the following description, the parts which are common to the different figures will be designated by the same reference numerals.

Figure 3:
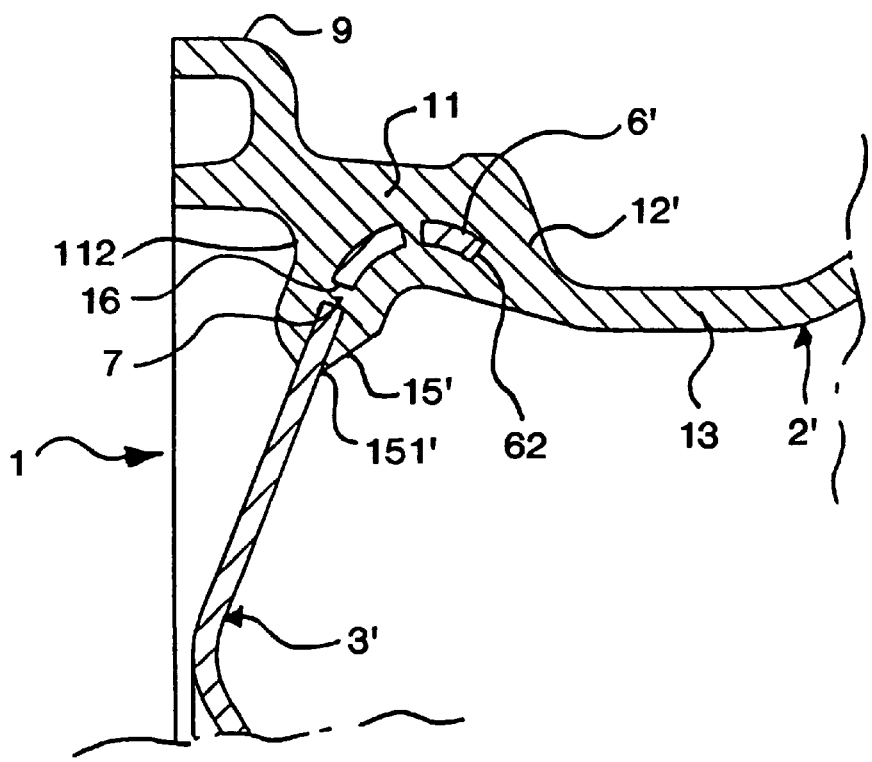
FIG. 3 is an enlargement of detail A in accordance with a variant embodiment of the wheel shown in FIG. 1.

A variant embodiment of wheel 1 is shown in FIG. 3. This variant differs from the preceding one by the positioning of the assembly edge 6' in the rim 2'.

The assembly edge 6' is inserted in the seat 11 via the radially inner wall 112 thereof and has an end 62 positioned at the place of the junction zone between said seat 11 and the section 12'. Furthermore, the seat 11 bears a protrusion 15' which is directed towards the inside of the rim 2' and into which the assembly edge 6' extends, the disk 3' extending from the rim 2' via a free end 151' of said protrusion 15'.

The assembly edge 6' is in this case curved towards the inside of the disk 3', namely towards the flange 8. The change in direction of the curvature as compared with the embodiment shown in FIGS. 1 and 2 is explained by the need to reestablish a certain equilibrium with regard to the rigidity of the central portion of the rim 2'.

This variant embodiment, which is in accord with the criteria of reliability indicated previously, may make it possible to produce a wheel in accordance with different geometric constraints.

The method of manufacturing a wheel in accordance with the invention will now be described briefly. It consists, in a first step, of producing the metal disk 3. This production can be effected conventionally by stamping or any other known technique.

The disk 3 may be formed by a metal such as a steel, aluminum, magnesium, or an aluminum or magnesium alloy. The thickness of the disk 3 as well as the other characteristics of the material are selected as a function of the characteristics of the vehicle on which the wheel is to be mounted.

The disk 3 obtained is then placed in a mold which surrounds its assembly edge 6, assuring tightness between the portion of the disk 3 to be overmolded and the rest of the disk 3.

In a third step, the composite material is injected into the mold, preferably through several points in order to have a uniform distribution of the material in the rim 2. The composite material spreads out thus throughout the entire rim 2 including into the holes 7 of the assembly edge 6 of the disk 3.

Different composite materials may be suitable, such as, for instance, a resin filled with long fibers or a thermoplastic filled with short fibers. However, thermoplastic materials, whether filled or not, are particularly suitable since the cycle time necessary for the overmolding operation is much shorter than in the case of a thermosetting material. Numerous thermoplastic materials can be used to produce this rim; by way of example, mention may be made of polyamide 6.6 reinforced by glass fibers.

This inexpensive method of manufacture makes it possible to produce wheels within a very short cycle time, and it is therefore of great interest from an industrial standpoint.

Furthermore, this method makes it possible, for rims of the same dimensions, to produce wheels with a great variety of combinations achieved by changing the design of the disk but maintaining the same geometry for the assembly edge.

We claim:

1. A wheel for motor vehicles comprising a rim made of composite material, a metal disk having a circumferentially outer peripheral region defining an assembly edge having opposite surfaces embedded in the rim to assemble the disk and the rim, and an annular protrusion integrally formed on an inner surface of the rim and extending towards the inside of the rim, the opposite surfaces of the assembly edge being inserted in the rim through the protrusion, the protrusion extending the area of the connection between the rim and the metal disk.

2. A wheel according to claim 1, characterized by the fact that the rim is formed of a thermoplastic material.

3. A wheel according to claim 1 in which the assembly edge contains assembly reinforcement holes distributed uniformly over its circumference and containing locking connections between the rim and the disk.

4. A wheel according to claim 1 in which the rim has bead retaining flanges of U-shaped axial section.

5. A wheel according to claim 1 in which the rim includes a seat, a well and an annular section which connects the seat and the well, the annular section being connected to the well at a junction zone, and in which the protrusion extends from the annular section in the region of the junction zone between the annular section and the well, the assembly edge being embedded in both the protrusion and the annular section and extending substantially in a direction parallel to the generatrices of the annular section.

6. A wheel according to claim 1 in which the rim includes a seat, a well and an annular section which connects the seat and the well, the protrusion extending from said annular section.

7. A wheel according to claim 6 in which the assembly edge is curved towards the seat.

8. A wheel according to claim 1 in which the rim includes a seat, a well and an annular section which connects the seat and the well, the protrusion extending inwardly from the seat.

9. A wheel according to claim 8 in which the assembly edge is curved towards the well in the rim.

10. A wheel for motor vehicles comprising a rim formed of composite material, a metal disk, an assembly edge forming the circumferential periphery of the disk for assembling the rim and the disk, the assembly edge having opposite faces which are embedded in and covered by the rim, a seat and a well formed in the rim, an annular section connecting the seat and the well, the seat having a radially inner wall in which the assembly edge is embedded with its inner end positioned at the location of a junction between said seat and the annular section, the seat having a protrusion having an end which is directed towards the inside of the rim and in which protrusion the assembly edge extends, the disk extending from the end of said protrusion.

11. A wheel according to claim 10 in which the assembly edge is curved towards the well of the rim.

* * * * *